(12) United States Patent
Mitsugi et al.

(10) Patent No.: US 11,108,449 B2
(45) Date of Patent: Aug. 31, 2021

(54) RADIO COMMUNICATION APPARATUS, RADIO COMMUNICATION SYSTEM AND RADIO COMMUNICATION METHOD

(71) Applicants: KEIO UNIVERSITY, Tokyo (JP); SCHOOL JUDICIAL PERSON IKUTOKUGAKUEN, Atsugi (JP); KYOWA ELECTRONIC INSTRUMENTS CO., LTD, Tokyo (JP)

(72) Inventors: Jin Mitsugi, Fujisawa (JP); Haruhisa Ichikawa, Fujisawa (JP); Yuusuke Kawakita, Atsugi (JP); Kiyoshi Egawa, Tokyo (JP)

(73) Assignees: KEIO UNIVERSITY, Tokyo (JP); SCHOOL JUDICIAL PERSON IKUTOKUGAKUEN, Kanagawa (JP); KYOWA ELECTRONIC INSTRUMENTS CO., LTD, Tokyo (JP)

( * ) Notice: Subject to any disclaimer, the term of this patent is extended or adjusted under 35 U.S.C. 154(b) by 0 days.

(21) Appl. No.: 16/728,177

(22) Filed: Dec. 27, 2019

(65) Prior Publication Data
US 2020/0313739 A1 Oct. 1, 2020

(30) Foreign Application Priority Data
Mar. 26, 2019 (JP) .............................. JP2019-058880

(51) Int. Cl.
*H04B 7/06* (2006.01)
*G01S 3/38* (2006.01)
(Continued)

(52) U.S. Cl.
CPC .............. *H04B 7/0615* (2013.01); *G01S 3/38* (2013.01); *G06K 19/0723* (2013.01); *H04B 7/0854* (2013.01)

(58) Field of Classification Search
CPC ..... G01S 1/02; G01S 3/38; G01S 5/02; G01S 5/14; G01S 5/30; G01S 13/08;
(Continued)

(56) References Cited

U.S. PATENT DOCUMENTS

| | | | | |
|---|---|---|---|---|
| 2010/0214071 A1* | 8/2010 | Nagai | .................. | G06K 7/0008 340/10.1 |
| 2010/0328073 A1* | 12/2010 | Nikitin | ...................... | G01S 5/12 340/572.1 |
| 2012/0002765 A1* | 1/2012 | Kawaguchi | .......... | G06K 7/0008 375/345 |

OTHER PUBLICATIONS

Hidehisa Shiomi, "Blind Estimation of DOA Using Independent Component Analysis for Radio Applications", Paper, May 2005, 327-334, vol. J92-A, No. 5, Fundamentals of Electronics, Communications and Computer Sciences, IEICE Transactions.

* cited by examiner

*Primary Examiner* — Shawkat M Ali
(74) *Attorney, Agent, or Firm* — Hayes Soloway PC

(57) ABSTRACT

A radio communication apparatus is described that includes a reception antenna, a converter, a calculator, and a separator. The reception antenna receives a mixed signal including two or more backscatter signals respectively transmitted from two or more tag devices and the converter converts the mixed signal into complex data on a complex plane. The calculator calculates phase angles of carrier waves of the two or more backscatter signals to approximate the phase angles into a complex data sequence of a predetermined length, and generates a projector matrix formed of a combination of the phase angles of carrier waves of the two or more backscatter signals. The separator separates the two or
(Continued)

more backscatter signals from the mixed signal based on an inverse matrix of the projector matrix and the complex data sequence.

8 Claims, 10 Drawing Sheets

(51) Int. Cl.
*G06K 19/07* (2006.01)
*H04B 7/08* (2006.01)

(58) Field of Classification Search
CPC ...... G01S 13/814; G06K 7/10; G06K 19/077; G06K 19/0723; H04B 1/10; H04B 7/00; H04B 7/0615; H04B 7/0854; H04L 27/06; H04L 27/148
USPC ........... 340/10.1, 10.4, 10.31, 572.1, 825.49; 342/127, 458; 375/219, 260, 267, 295, 375/316, 340, 350
See application file for complete search history.

RADIO COMMUNICATION APPARATUS, RADIO COMMUNICATION SYSTEM AND RADIO COMMUNICATION METHOD

CROSS-REFERENCE TO RELATED APPLICATION

This application claims priority to Japanese patent application JP2019-58880, filed on Mar. 26, 2019, the contents of which are incorporated herein by reference.

TECHNICAL FIELD

The present application relates to a radio communication apparatus, a radio communication system and a radio communication method.

BACKGROUND

Conventionally, many methods are proposed to separate two or more backscatter signals respectively transmitted from two or more tag devices with backscatter communication. As such a method, the mainstream is to calculate propagation coefficients between tag devices and receivers and to perform signal separation by multiplying the propagation coefficients to the signal (hereinafter, a mixed signal) transmitted from the two or more tag devices. However, there is a problem that communication capacity or signal processing may not be negligible. Accordingly, a method (hereinafter, a blind signal separation) is proposed to separate the two or more backscatter signals from the mixed signal transmitted from the two or more tag devices by use of an independent component analysis (for example, Non-patent Literature 1).

SUMMARY

A first feature is summarized as a radio communication apparatus, comprising: a reception antenna receives a mixed signal including two or more backscatter signals respectively transmitted from two or more tag devices, a converter converts the mixed signal into complex data on a complex plane, a calculator calculates at least phase angles of carrier waves of the two or more backscatter signals so as to approximate the phase angles to a complex data sequence of a predetermined length, the complex data sequence formed of the complex data, and generates a projector matrix formed of a combination of the phase angles of carrier waves of the two or more backscatter signals, and a separator separates the two or more backscatter signals from the mixed signal based on an inverse matrix of the projector matrix and the complex data sequence.

A second feature is summarized as a radio communication system comprising a radio communication apparatus and two or more tag devices, wherein the two or more tag devices respectively comprises: a transmitter transmits a backscatter signal, and the radio communication apparatus comprises: a reception antenna receives a mixed signal including two or more backscatter signals respectively transmitted from the two or more tag devices, a converter converts the mixed signal into complex data on a complex plane, a calculator calculates at least phase angles of carrier waves of the two or more backscatter signals so as to approximate the phase angles to a complex data sequence of a predetermined length, the complex data sequence formed of the complex data, and generates a projector matrix formed of a combination of the phase angles of carrier waves of the two or more backscatter signals, and a separator separates the two or more backscatter signals from the mixed signal based on an inverse matrix of the projector matrix and the complex data sequence.

A third feature is summarized as a radio communication method, comprising steps of: receiving a mixed signal including two or more backscatter signals respectively transmitted from two or more tag devices, converting the mixed signal into complex data on a complex plane, calculating at least phase angles of carrier waves of the two or more backscatter signals so as to approximate the phase angles to a complex data sequence of a predetermined length, the complex data sequence formed of the complex data, and generating a projector matrix formed of a combination of the phase angles of carrier waves of the two or more backscatter signals, and separating the two or more backscatter signals from the mixed signal based on an inverse matrix of the projector matrix and the complex data sequence.

DETAILED DESCRIPTION

Figure 1:
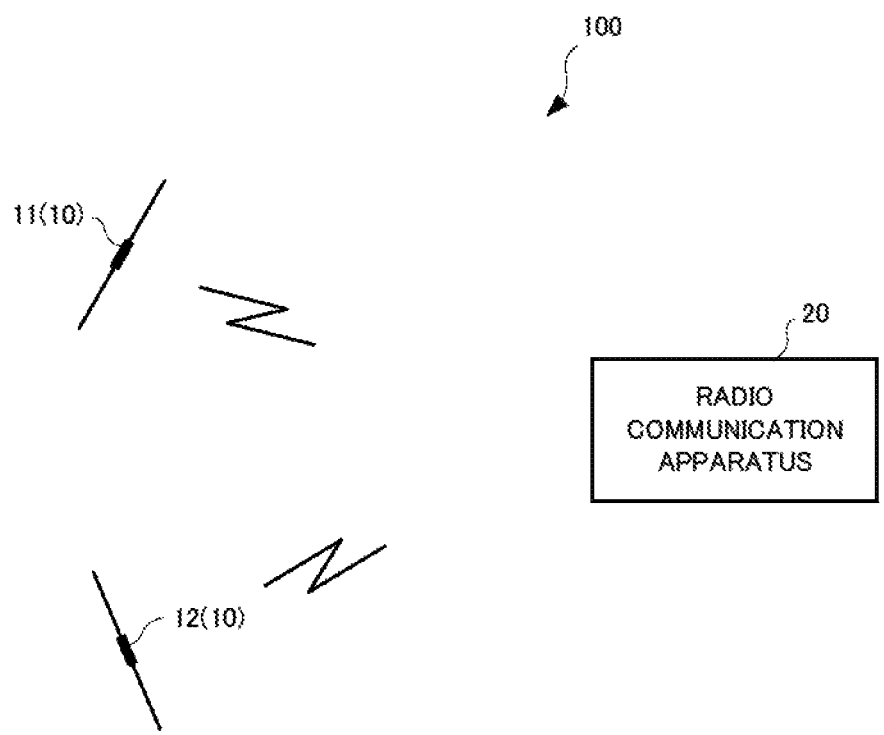
FIG. 1 is a diagram showing a radio communication system 100 according to an embodiment.

Hereinafter, embodiments will be described by use of drawings. In the following description of the drawings, the same or similar parts are denoted by the same or similar reference numerals.

It is noted that the drawings are schematic, and the ratios of dimensions and the like may be different from the actual ones. Therefore, specific dimensions and the like should be determined by referring to the following description. Of course, the drawings may include parts with different dimensions and ratios.

However, according to the blind signal separation described in the background art, a radio communication apparatus needs to have reception antennas equal to or more than the number of the two or more tag devices. On the other hand, there would be a demand to decrease the number of the reception antennas for downsizing the radio communication apparatus, a demand to realize a signal separation swiftly such as a real-time, or a demand to improve SN (signal to noise) ratio.

A radio communication apparatus according to an overview of a disclosure comprises: a reception antenna receives a mixed signal including two or more backscatter signals respectively transmitted from two or more tag devices, a converter converts the mixed signal into complex data on a complex plane, a calculator calculates at least phase angles of carrier waves of the two or more backscatter signals so as to approximate the phase angles to a complex data sequence of a predetermined length, the complex data sequence formed of the complex data, and generates a projector matrix formed of a combination of the phase angles of carrier waves of the two or more backscatter signals, and a separator separates the two or more backscatter signals from the mixed signal based on an inverse matrix of the projector matrix and the complex data sequence.

The inventors have studied carefully and focused on the new viewpoint that the mixed signal received by the radio communication apparatus can be defined by a combination of phase angles of carrier waves of the two or more backscatter signals and priori probability of the backscatter signals can be determined without depending on a coding rate and a bit rate employed. In the overview of the disclosure, based on the new viewpoint above, the two or more backscatter signals are separated from the mixed signal based on the inverse matrix of the projector matrix and the complex data sequence. According to such a configuration, the signal separation can be realized by multiplying the mixed signal (the received signal) to the inverse matrix of the projector matrix (hereinafter, it can be referred to as a separation matrix). Since the backscatter signal after removing a bias component moves on a straight line passing an origin (zero, for example) on a complex plane, and the complex data obtained from the backscatter signal includes two components of In-phase and Quadrature-phase, two signals can be separated from the single combination of the complex data obtained by the single antenna. Accordingly, the two or more backscatter signals can be separated while decreasing the number of the reception antenna. Further, since the separation matrix is calculated by use of the priori probability, the number of iteration calculations for obtaining the appropriate separation matrix can be decreased, and since the multiplication of the complex data sequence of the predetermined length is not necessary, the separation matrix can be calculated swiftly. Alternately, an SN ratio of the backscatter signal can be improved while not increasing the number of the reception antenna.

Radio Communication System

Hereinafter, a radio communication system according to an embodiment is explained. FIG. 1 is a diagram showing a radio communication system 100 according to the embodiment.

As shown in FIG. 1, the radio communication system 100 includes two or more tag devices 10 and a radio communication apparatus 20.

The tag device 10 transmits a backscatter signal. For example, the tag device 10 may be an RF tag, an electric tag, an IC tag, a transponder or the like. The tag device 10 modulates a carrier signal (a carrier wave) based on an output from a measurement apparatus or the like, and reflects the modulated signal as the backscatter signal. Although not limited, the measurement apparatus may be a strain gauge, a pressure sensor, an acceleration sensor, a torque sensor, a displacement sensor, or the like. The tag device 10 may have a thin film shape. Here, a case will be exemplified that two tag devices (a tag device 11 and a tag device 12) are provided.

The radio communication apparatus 20 receives a mixed signal including the two backscatter signals respectively transmitted from the two tag devices 20. The radio communication apparatus 20 separates the two backscatter signals from the mixed signal. The radio communication apparatus 20 may include a transmission antenna transmitting the carrier signal described above. In such a case, the radio communication apparatus 20 can be referred to as an interrogator (a reader/writer). However, the carrier signal may be transmitted from an apparatus other than the radio communication apparatus 20. Hereinafter, the transmission of the carrier signal is omitted to clarify the explanation.

Radio Communication Apparatus

Hereinafter, the radio communication apparatus according to the embodiment is explained. FIG. 1 is a diagram showing the radio communication apparatus 20 according to the embodiment.

Figure 2:
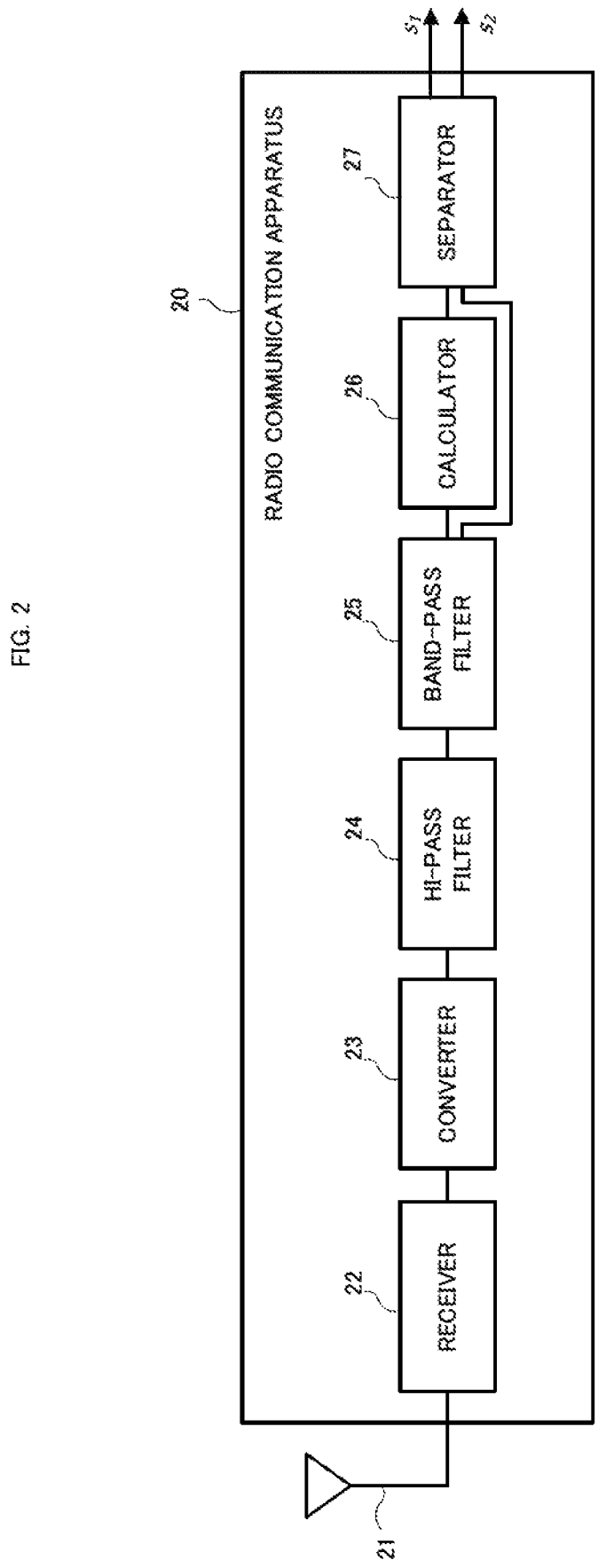
FIG. 2 is a diagram showing a radio communication apparatus 20 according to the embodiment.

As shown in FIG. 2, the radio communication apparatus 20 includes a reception antenna 21, a receiver 22, a converter 23, a high-pass filter 24, a band-pass filter 25, a calculator 26, and a separator 27.

The reception antenna 21 receives the mixed signal including the two backscatter signal respectively transmitted from the two tag devices 10. The number of reception antenna 21 may be less than the number of the backscatter signals for separation (the number of the tag devices). Hereinafter, a case will be explained that the single antenna 21 is provided.

The receiver 22 converts the mixed signal into a baseband frequency. For example, the receiver converts the mixed signal into a baseband frequency using the carrier signal (DC; Direct Conversion). Alternately, the receiver 22 converts the mixed signal into an intermediate frequency.

The converter 23 converts the mixed signal into complex data (it can be referred to as a received complex data) on a complex plane (hereinafter, IQ plane). The complex data is formed of I component and Q component. The complex data transmitted from the converter 23 is input to the high-pass filter 24.

The high-pass filter 24 passes through high-frequency component while not passing through low-frequency component among the frequency component output from the converter 23.

The band-pass filter 25 passes through the desired frequency component while not passing through undesired frequency component among the frequency component output from the high-pass filter 24.

Hereinafter, the process to remove a bias component such as the low-frequency component and the undesired frequency component may be referred to as a filter process.

The calculator 26 acquires the complex data after removing the bias component. Hereinafter, the complex data after removing the bias component may be simply referred to as the mixed signal. The calculator 26 calculates at least phase angles of carrier waves of the two backscatter signals so as to approximate the phase angles to a complex data sequence of a predetermined length (hereinafter, IQ frame), the complex data sequence formed of the complex data. The calculator 26 generates a projector matrix formed of a combination of the phase angles of carrier waves of the two backscatter signals.

The projector matrix $\Phi$ is expressed as the following Equation 1. The detail of the projector matrix will be described later.

$$\Phi = \begin{bmatrix} \cos \varphi_1 & \cos \varphi_2 \\ \sin \varphi_1 & \sin \varphi_2 \end{bmatrix} \quad \text{Equation 1}$$

Here, the $\varphi_1$ denotes the phase angle of the carrier wave of the backscatter signal transmitted from the tag device 11. The $\varphi_2$ denotes the phase angle of the carrier wave of the backscatter signal transmitted from the tag device 12.

The separator 27 separates the two backscatter signals from the mixed signal based on an inverse matrix (the separation matrix) of the projector matrix and the complex data sequence. The separator 27 separates the two backscatter signals based on the following Equation 2.

$$\begin{Bmatrix} s_{1n} \\ s_{2n} \end{Bmatrix} = \Phi^{-1} x_n \qquad \text{Equation 2}$$

Here, the $s_{1_n}$ denotes the separated backscatter signal transmitted from the tag device 11. The $s_{2_n}$ denotes the separated backscatter signal transmitted from the tag device 12.

Detail of Signal Separation

Figure 3:
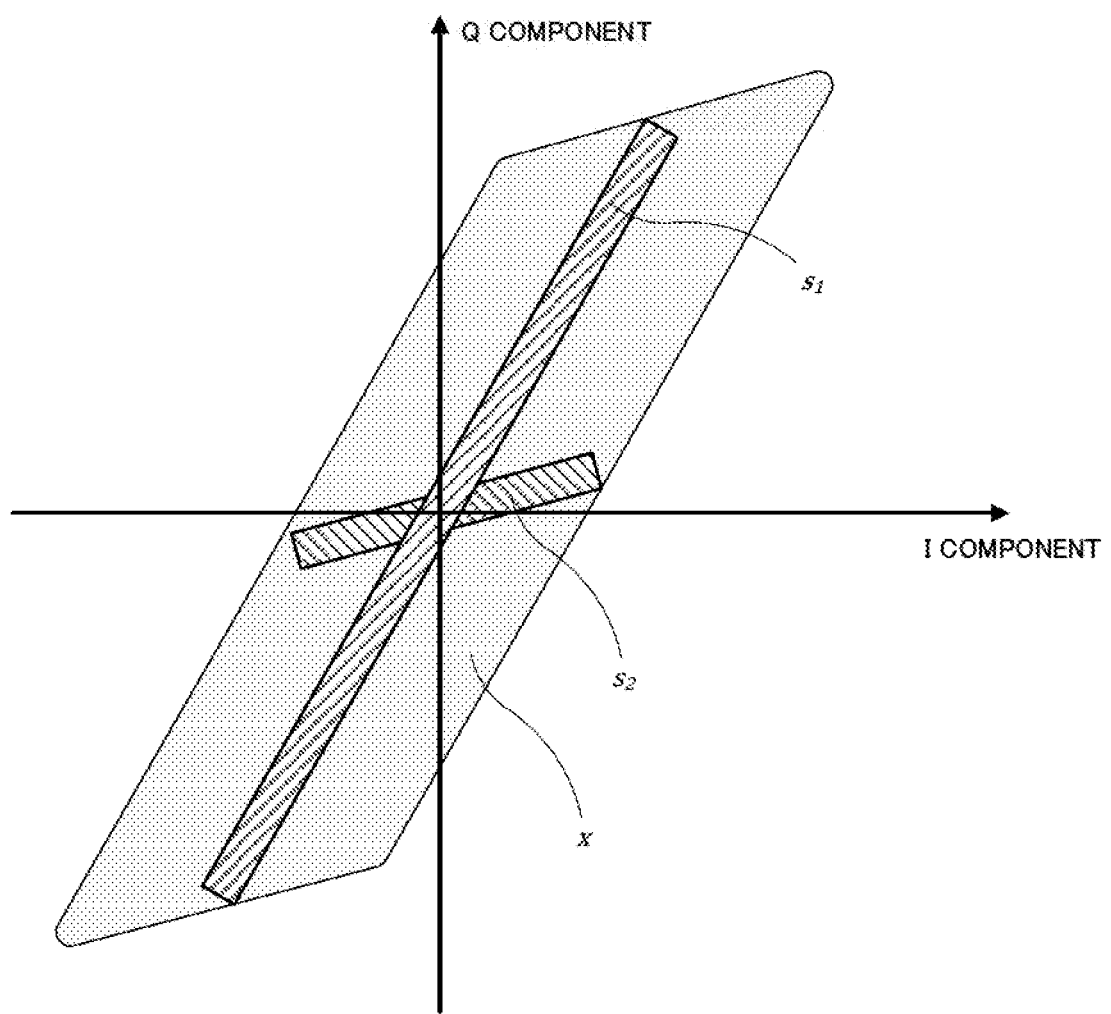
FIG. 3 is a diagram for explaining a signal separation according to the embodiment.
Figure 4:
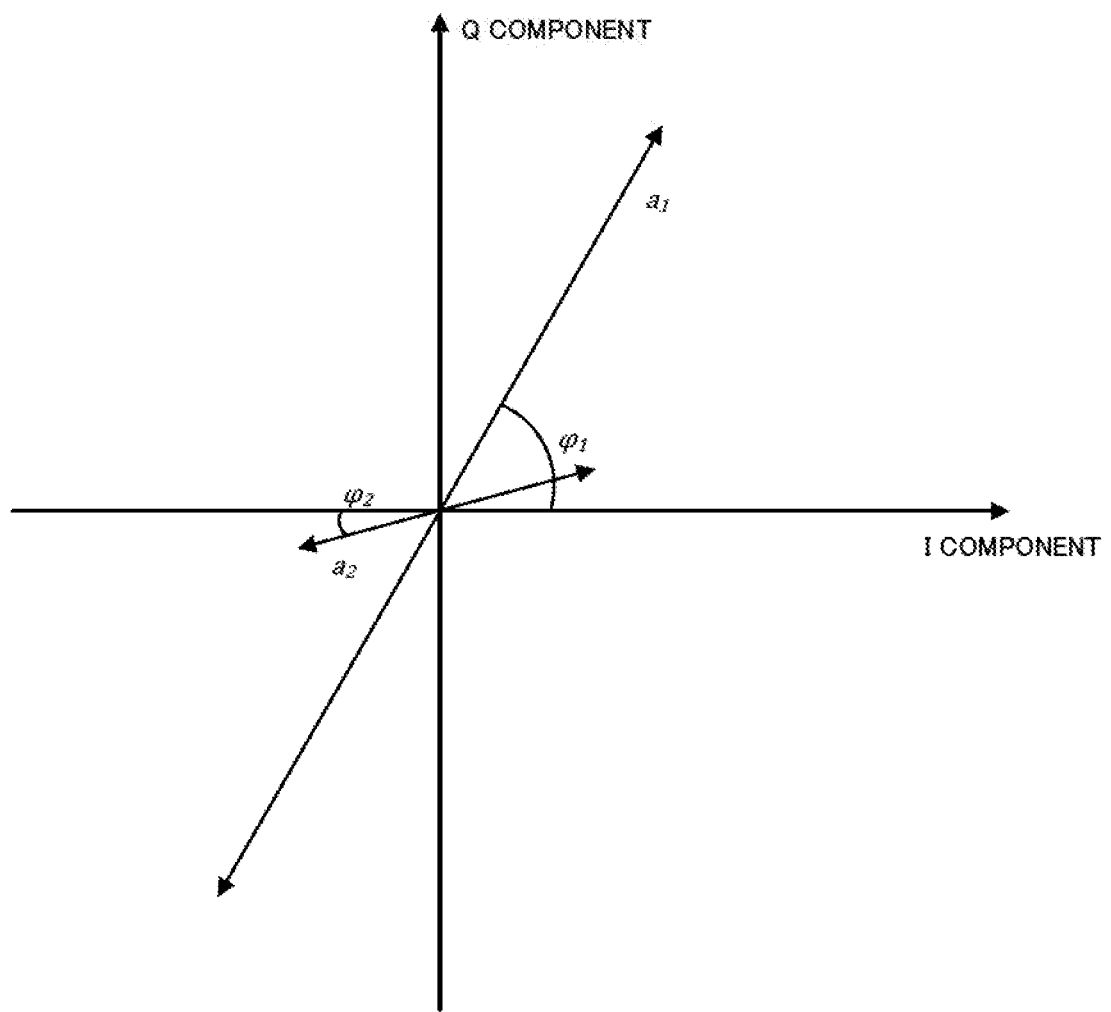
FIG. 4 is a diagram for explaining the signal separation according to the embodiment.

Hereinafter, the detail of the signal separation according to the embodiment is explained. FIGS. 3 and 4 are diagrams showing the detail of the signal separation.

Specifically, the complex data sequence of the mixed signal $x_n$ included in the IQ frame has a constellation shown in FIG. 3. As shown in FIG. 3, the complex data sequence of the mixed signal $x_n$ includes real number sequences of the two backscatter signals $s_{1_n}$, $s_{2_n}$.

Here, the inventors et al. have studied carefully and focused on that each of the two backscatter signals $s_{1_n}$, $s_{2_n}$ is a zero-crossing signal adjusted to ideally cross an origin (zero, for example) on the IQ plane. The term "ideally" means that frequency stability of the tag device 10 is sufficiently high, there is no influence caused by radio wave propagation, and the bias component has been removed sufficiently by the filter process. Under such a viewpoint, the inventors have found out that a covariance matrix of the constellation can be defined by a phase angle $\varphi_1$ and an amplitude $a_1$ of the carrier wave of the backscatter signal $s_{1_n}$ and a phase angle $\varphi_2$ and an amplitude $a_2$ of the carrier wave of the backscatter signal $s_{2_n}$ (see FIG. 4).

Specifically, it is shown as follow. Firstly, the complex data sequence x of the mixed signal $x_n$ is expressed by the following Equation 3.

$$x = \begin{bmatrix} e^{j\varphi_1} & e^{j\varphi_2} \end{bmatrix} \begin{Bmatrix} s_1 \\ s_2 \end{Bmatrix} \qquad \text{Equation 3}$$

Secondly, the covariance matrix C of the complex data sequence x of the mixed signal $x_n$ is expressed by the following Equations 4 to 6.

$$C = E(xx^T) \qquad \text{Equation 4}$$

$$= E\left( \begin{bmatrix} e^{j\varphi_1} & e^{j\varphi_2} \end{bmatrix} \begin{Bmatrix} s_1 \\ s_2 \end{Bmatrix} \begin{Bmatrix} s_1^T & s_2^T \end{Bmatrix} \begin{bmatrix} e^{j\varphi_1} \\ e^{j\varphi_2} \end{bmatrix} \right) \qquad \text{Equation 5}$$

$$= \begin{bmatrix} e^{j\varphi_1} & e^{j\varphi_2} \end{bmatrix} E\left( \begin{bmatrix} s_1 s_1^T & s_1 s_2^T \\ s_2 s_1^T & s_2 s_2^T \end{bmatrix} \right) \begin{bmatrix} e^{j\varphi_1} \\ e^{j\varphi_2} \end{bmatrix} \qquad \text{Equation 6}$$

Thirdly, the zero-crossing signal (the backscatter signal) can be expressed by a phase-modulated trigonometric function, a phase angle $\theta$ is in a range of $-\pi < \theta \le \pi$, and a distribution $p(\theta)$ of the phase angle $\theta$ is a uniform distribution (that is, $1/2\pi$). Under such a premise, introduced is a parameter t which satisfies the following Equations 7 and 8 for the i-th zero-crossing signal (the backscatter signal).

$$t = a_i \sin \theta \qquad \text{Equation 7}$$

$$\frac{dt}{d\theta} = a_i \cos \theta \qquad \text{Equation 8}$$

Because of the sinusoidal nature, the small change of $\theta$ contributes double in f(t) which indicates the probability of i-th t, and therefore a relationship of $(t)dt = 2p(\theta)d\theta$ is satisfied. Based on such a relationship, f(t) is expressed as the following Equation 9.

$$f(t) = \frac{1}{\pi} \frac{1}{\sqrt{a_i^2 - t^2}} \qquad \text{Equation 9}$$

The f(t) has the properties of the following Equations 10 to 12.

$$\int_{-a_t}^{a_t} f(t)dt = 1 \qquad \text{Equation 10}$$

$$\int_{-a_t}^{a_t} tf(t)dt = 0 \qquad \text{Equation 11}$$

$$\int_{-a_t}^{a_t} t^2 f(t)dt = \frac{a_t^2}{2} \qquad \text{Equation 12}$$

Here, statistical mean values of $s_1$ and $s_2$ are zero. Accordingly, the covariance matrix of Equation 6 can be rewritten as the following Equation 13 based on the property of Equation 12.

$$C = \begin{bmatrix} \frac{a_1^2}{2}\cos^2\varphi_1 + \frac{a_2^2}{2}\cos^2\varphi_2 & \frac{a_1^2}{2}\cos\varphi_1\sin\varphi_1 + \frac{a_2^2}{2}\cos\varphi_2\sin\varphi_2 \\ \frac{a_1^2}{2}\cos\varphi_1\sin\varphi_1 + \frac{a_2^2}{2}\cos\varphi_2\sin\varphi_2 & \frac{a_1^2}{2}\sin^2\varphi_1 + \frac{a_2^2}{2}\sin^2\varphi_2 \end{bmatrix} \qquad \text{Equation 13}$$

Fourthly, since $E(xx^T)$ shown in Equation 4 are observable, the unknown parameters ($a_1$, $a_2$, $\varphi_1$, $\varphi_2$) can be calculated so that the covariance matrix C approximates $E(xx^T)$. In other word, the calculator 26 calculates the phase angles ($\varphi_1$, $\varphi_2$) of the carrier wave of the two backscatter signals by approximating the covariance matrix C to the complex data sequence $E(xx^T)$ of the predetermined length, the covariance matrix C defined by use of the variances of amplitudes ($a_1^2/2$, $a_2^2/2$) and the phase angles ($\varphi_1$, $\varphi_2$) of the carrier waves of the two backscatter signals $s_1$ and $s_2$. Although not limited, the calculation of approximate value may be Newton's method.

According to the calculation described above, since the phase angles $\varphi_1$, $\varphi_2$ of the carrier waves of the two backscatter signals $s_1$ and $s_2$ are calculated, it enables the generation of the projector matrix shown in Equation 1.

As described above, the backscatter signal is adjusted to ideally cross the origin (zero, for example) on the IQ plane. Accordingly, the statistical mean value of the complex data of respective backscatter signals included in the IQ frame approximates zero, and the statistical variance of the complex data of respective backscatter signals included in the IQ frame approximates $a^2/2$. By utilizing such properties, the covariance matrix can be expressed in a simple manner as the above Equation 13.

Radio Communication Method

Figure 5:
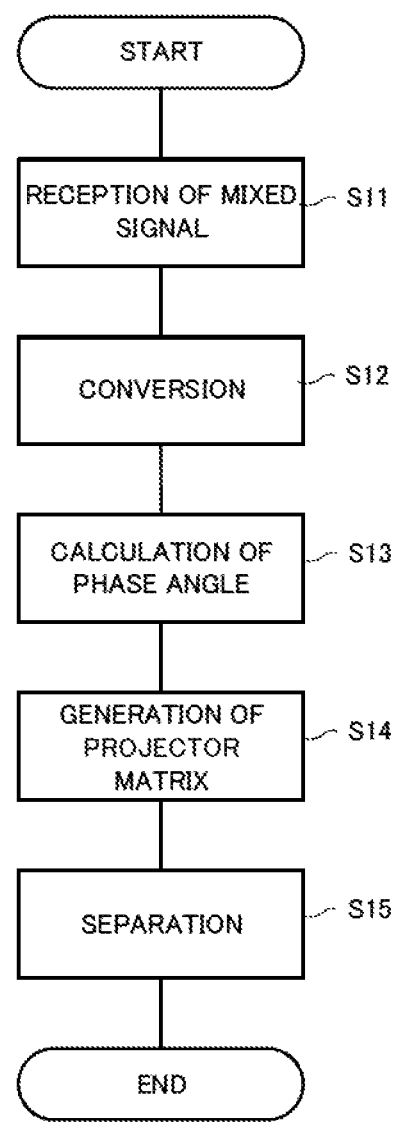
FIG. 5 is a diagram showing a radio communication method according to the embodiment.

Hereinafter, a radio communication method according to the embodiment is explained. FIG. 5 is a diagram showing the radio communication method according to the embodiment.

As shown in FIG. 5, in step S11, the radio communication apparatus 20 receives the mixed signal including the two backscatter signals respectively transmitted from the two tag devices 10. The radio communication apparatus 20 converts the mixed signal into the baseband frequency or the intermediate frequency.

In step S12, the radio communication apparatus 20 converts the mixed signal into the complex data on the IQ plane. The radio communication apparatus 20 removes the bias component from the complex data by the filter process.

In step S13, the radio communication apparatus 20 calculates the phase angles ($\varphi_1$, $\varphi_2$) of the carrier waves of the two backscatter signals so as to approximate the phase angles to the IQ frame formed of the complex data. As the calculation of phase angles ($\varphi_1$, $\varphi_2$), refer to Equations 3 to 12 described above.

In step S14, the radio communication apparatus 20 generates the projector matrix formed of the combination of the phase angles of carrier waves of the two backscatter signals. The projector matrix $\Phi$ is expressed by Equation 1 described above.

In step S15, the radio communication apparatus 20 separates the two backscatter signals from the mixed signal based on the inverse matrix of the projector matrix and the complex data sequence. The radio communication apparatus 20 separates the two backscatter signals based on Equation 2 described above.

In the embodiment, the two backscatter signals are separated from the mixed signal based on the inverse matrix of the projector matrix and the complex data sequence, the projector matrix being formed of the combination of the phase angles of carrier waves of the two backscatter signals. According to such a configuration, by focusing on that the backscatter signal moves on a straight line passing the origin (zero, for example) on a complex plane, and the complex data obtained from the backscatter signal includes two components of In-phase and Quadrature-phase, the signal separation can be realized by multiplying the inverse matrix (the separation matrix) of the projector matrix to the mixed signal (the received signal). Accordingly, the two backscatter signals can be separated while decreasing the number of the reception antenna 21. Since the separation matrix is calculated by use of the priori probability, the number of the iteration calculations for obtaining the appropriate separation matrix can be decreased. Moreover, since the multiplication of the complex data sequence of the predetermined length is not necessary, the separation matrix can be calculated swiftly. Therefore, the two backscatter signals can be separated swiftly.

First Modification

Hereinafter, the first modification of the embodiment will be explained. The difference from the embodiment will be mainly explained below.

In the embodiment, exemplified is a case that the single reception antenna receives the two backscatter signal respectively transmitted from the two tag devices 10. On the contrary, in the first modification, exemplified is a case that two reception antennas each receive three backscatter signals respectively transmitted from three tag devices 10.

Figure 6:
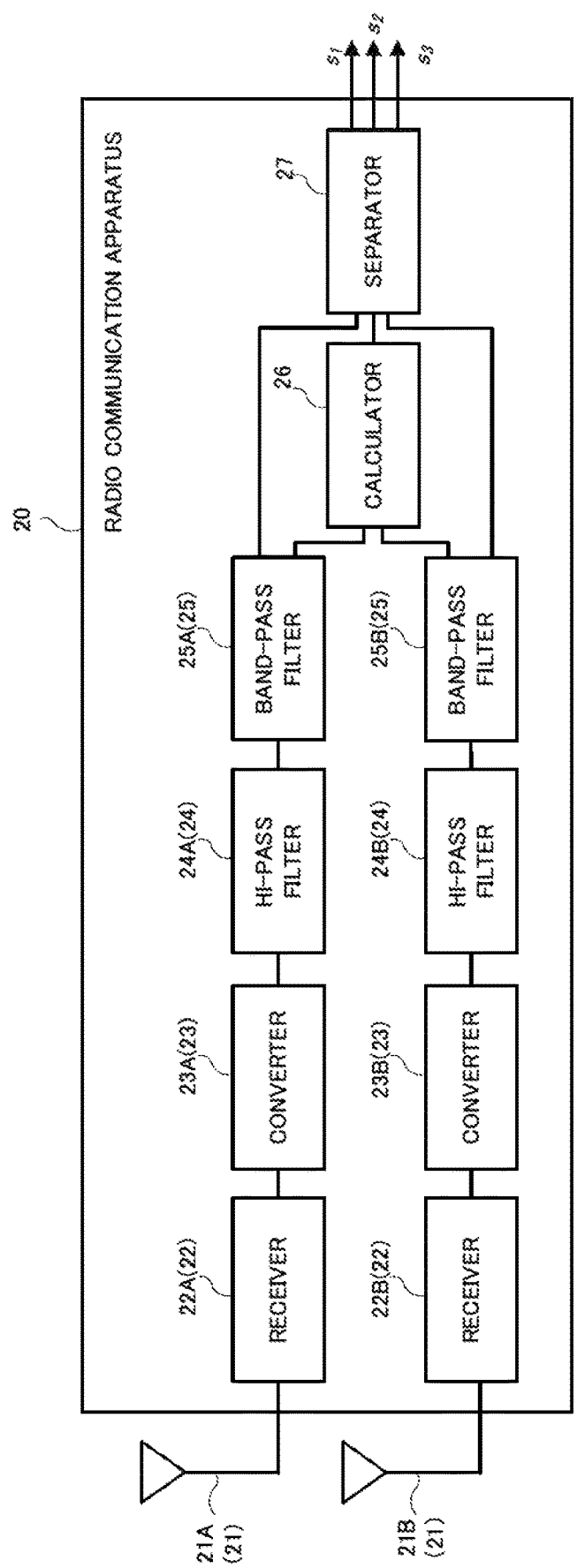
FIG. 6 is a diagram showing a radio communication apparatus 20 according to a first modification.

As shown in FIG. 6, the radio communication apparatus 10 includes two reception antennas (a reception antenna 21A and a reception antenna 21B). The radio communication apparatus 10 includes configurations (a receiver 22A, a converter 23A, a high-pass filter 24A, and a band-pass filter 25A) to convert the mixed signal received by the reception antenna 21A into the complex data. Similarly, the radio communication apparatus 10 includes configurations (a receiver 22B, a converter 23B, a high-pass filter 24B, and a band-pass filter 25B) to convert the mixed signal received by the reception antenna 21B into the complex data.

Here, the mixed signals received by the reception antenna 21A and the reception antenna 21B are signals having a different phase or amplitude, since the reception antenna 21A and the reception antenna 21B are provided at different positions. Accordingly, the rank of the covariance matrix becomes 4, which can be generated by the complex data obtained from the reception antenna 21A and the reception antenna 21B.

In other word, four backscatter signals can be separated at most by using the two reception antennas 21. Accordingly, needless to say that three backscatter signals $s_1$, $s_2$, $s_3$ can be separated as shown in FIG. 6.

In the first modification, two reception antennas are assigned, as the reception antenna, to a predetermined tag device which is one of the two or more tag devices 10.

The radio communication apparatus 20 (the separator 27) may separate the two predetermined backscatter signal respectively from the two mixed signals received by the two reception antennas 21, and may acquire the backscatter signal corresponds to the predetermined tag device by combining the two predetermined backscatter signal.

For example, premising that the tag device 10 transmitting the backscatter signal $s_1$ is the predetermined tag device, the reception antenna 21A and reception antenna 21B are assigned to the predetermined device. Accordingly, after the generation of the projector matrix, the radio communication apparatus 20 may obtain the final backscatter signal $s_1$ by combining the backscatter signal $s_1$ separated from the mixed signal received by the reception antenna 21A and the backscatter signal $s_1$ separated from the mixed signal received by the reception antenna 21B.

Here, the backscatter signal $s_1$ is disclosed as an example, the similar process can be applied to the backscatter signal $s_2$ and the backscatter signal $s_3$.

According to the first modification, three backscatter signals can be separated by using two reception antennas by introducing idea similar to the embodiment. According to such a configuration, no need to prepare three reception antennas for separating three backscatter signals, and three backscatter signals can be separated while decreasing the number of the reception antenna 21.

In the first modification, the radio communication apparatus 20 may separate the two predetermined backscatter signal respectively from the two mixed signals received by the two reception antennas 21, and may acquire the backscatter signal corresponds to the predetermined tag device by combining the two predetermined backscatter signal. According to such a configuration, since the independent components are combined into the same phase while the noise components cannot be in the same phase, the SN ratio of the backscatter signal can be improved compared to the single reception antenna.

First Evaluation Result

Figure 7:
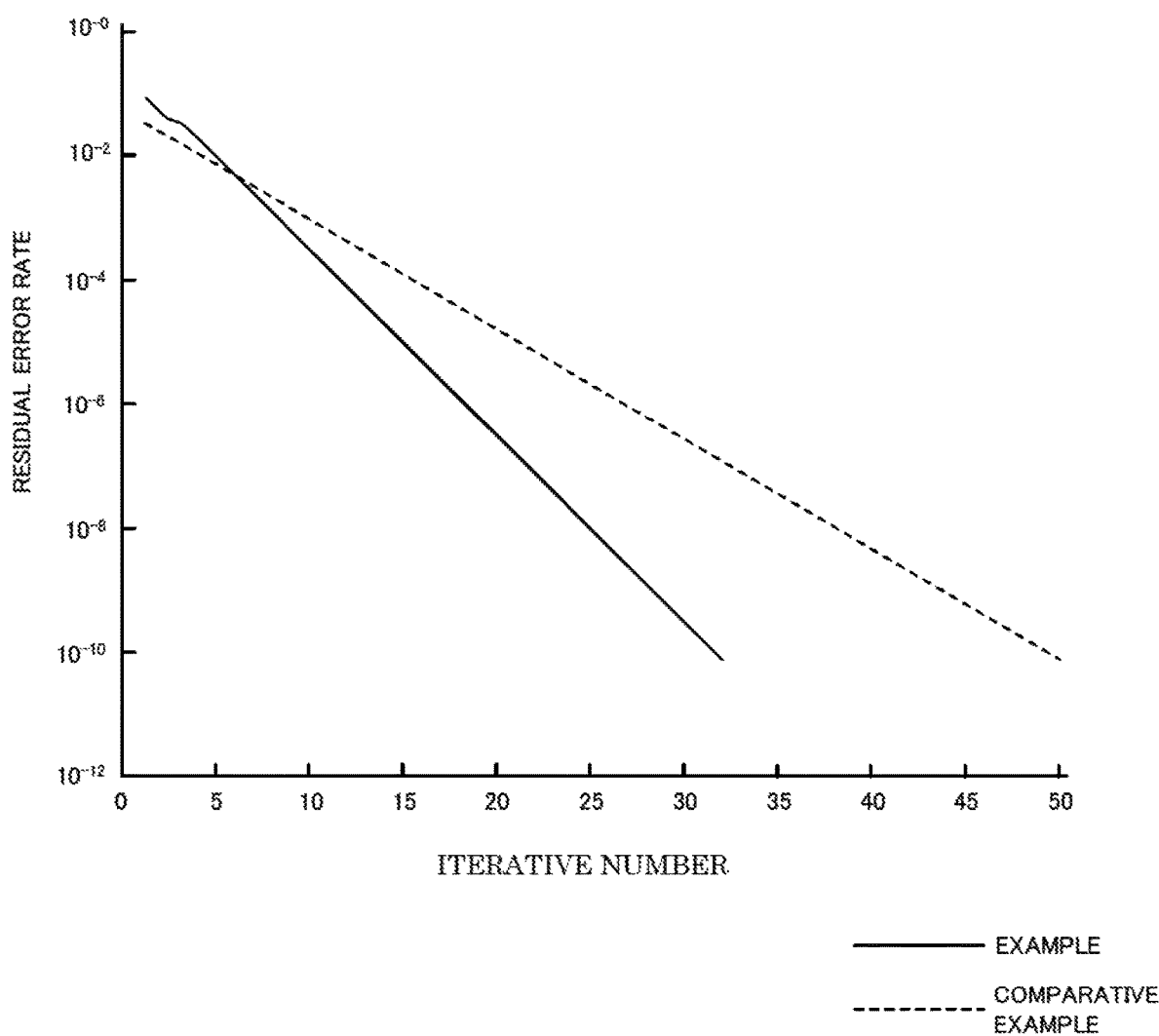
FIG. 7 is a diagram showing a first evaluation result.
Figure 8:
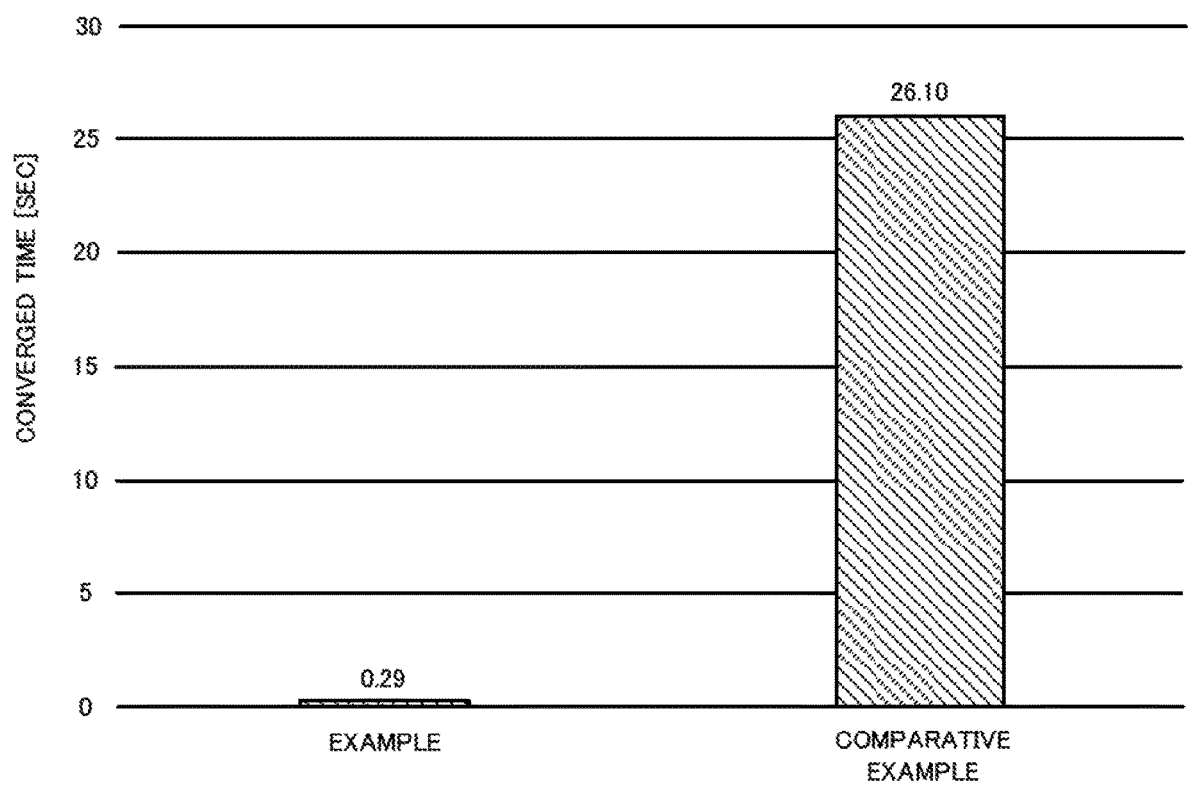
FIG. 8 is a diagram showing the first evaluation result.

Hereinafter, the first evaluation result is explained. FIGS. 7 and 8 show the first evaluation result. The first evaluation result indicates a compared result between Example and Comparative example. Here, it exemplifies a case for calculating the separation matrix from the mixed signal (the observed signal) for the IQ frame formed of 48,000 samples.

In Example, the separation matrix is calculated according to the method explained in the embodiment described above. Specifically, in Example, calculated values of four components (actually, three components because anti-diagonal components have the same value) included in 2 by 2 covariance matrix are calculated based on 48,000 samples (the observed signal/the mixed signal). Subsequently, parameters ($a_1$, $a_2$, $\varphi_1$, $\varphi_2$) are calculated by an iterative calculation so as to minimize the error between the calculated value and the components included in the covariance matrix C expressed by Equation 13 described above.

On the other hand, in Comparative example, the separation matrix is calculated based on the independent component analysis minimizing a differential value of kurtosis. Specifically, in Comparative example, specified are two-dimensional vectors ($w_1$ and $w_2$) defined by components included in 2 by 2 separation matrix. The two-dimensional vectors have constraint conditions that respective vectors are orthogonal each other and respective vectors have a length of one. Under such condition, the initial value is given to the vector $w_1$, and a calculation of the differential value of kurtosis satisfying the constraint conditions is performed, while the calculation accompanies a process of multiplying the vector $w_1$ to 48,000 samples applied with a coordinate transformation if needed (a calculation using Lagrange multiplier). The vector $w_1$ is calculated by an iterative calculation so that the differential value of kurtosis becomes a stationary value (a calculation using Jacobian matrix). Here, the $n^{th}$ iterative calculation accompanies a process of multiplying the vector $w_1$ calculated by the $n-1^{th}$ iterative calculation to the 48,000 samples. Finally, the vector $w_2$, which is orthogonal to the vector $w_1$, is calculated based on the vector $w_1$.

Firstly, evaluated is a relationship between the number of the iterative calculations (hereinafter, iterative number) for the separation matrix and the residual error ratio of the separated backscatter signal. In FIG. 7, a vertical axis indicates the residual error ratio of the separated backscatter signal, and a horizontal axis indicates the iterative number. That is, the evaluation result shown in FIG. 7 indicates the iterative number the residual error ration becomes sufficiently small. As shown in FIG. 7, it is confirmed that Example can realize the sufficiently small residual ratio ($10^{-10}$, for example) at the iterative number less than Comparative example.

According to Example, since the variance of the amplitude is assumed as a predetermined value ($a^2/2$) and the backscatter signal is assumed as the zero-crossing signal, the calculation of the separation matrix is performed using such a priori probability. On the other hand, according to Comparative example, the priori probability is not used for the calculation of the separation matrix. Accordingly, it is considered that Example can realize the sufficiently small residual ratio at the iterative number less than Comparative example.

Secondly, evaluated is a time (hereinafter, converged time) until the residual error ratio becomes the sufficiently small residual ratio ($10^{-10}$, for example) by use of a personal computer of Windows 10 Core i7 2.8 GHz and 20 GB memory. In FIG. 8, a vertical axis indicates the converged time.

As shown in FIG. 8, it is confirmed that the calculation time in Example is very short compared to Comparative Example.

According to Example, 48,000 samples are merely used for obtaining the calculated value of four components (actually, three component) forming 2 by 2 covariance matrix, and the multiplication of 48,000 samples is not required for the iterative calculation. On the other hand, according to Comparative example, the multiplication of 48,000 samples is required for each iterative calculation as described above. Accordingly, it is considered that the calculation time in Example is very short compared to Comparative example.

Second Evaluation Result

Figure 9:
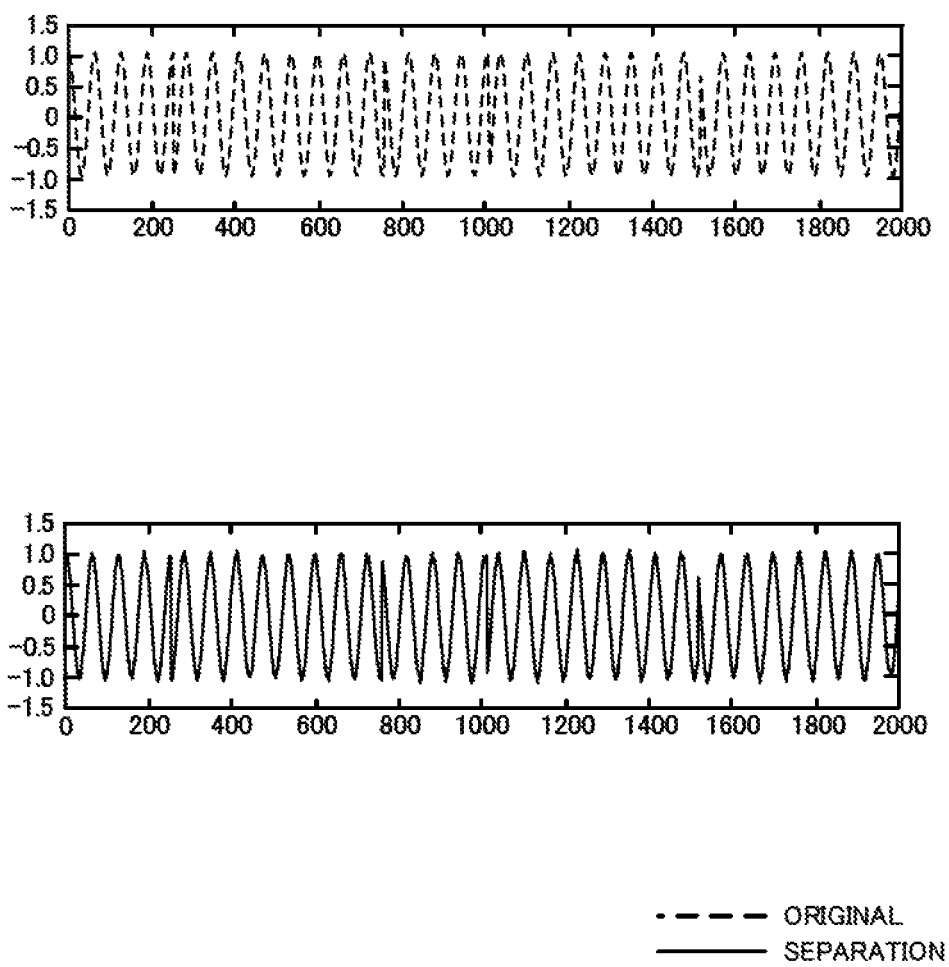
FIG. 9 is a diagram showing a second evaluation result.
Figure 10:
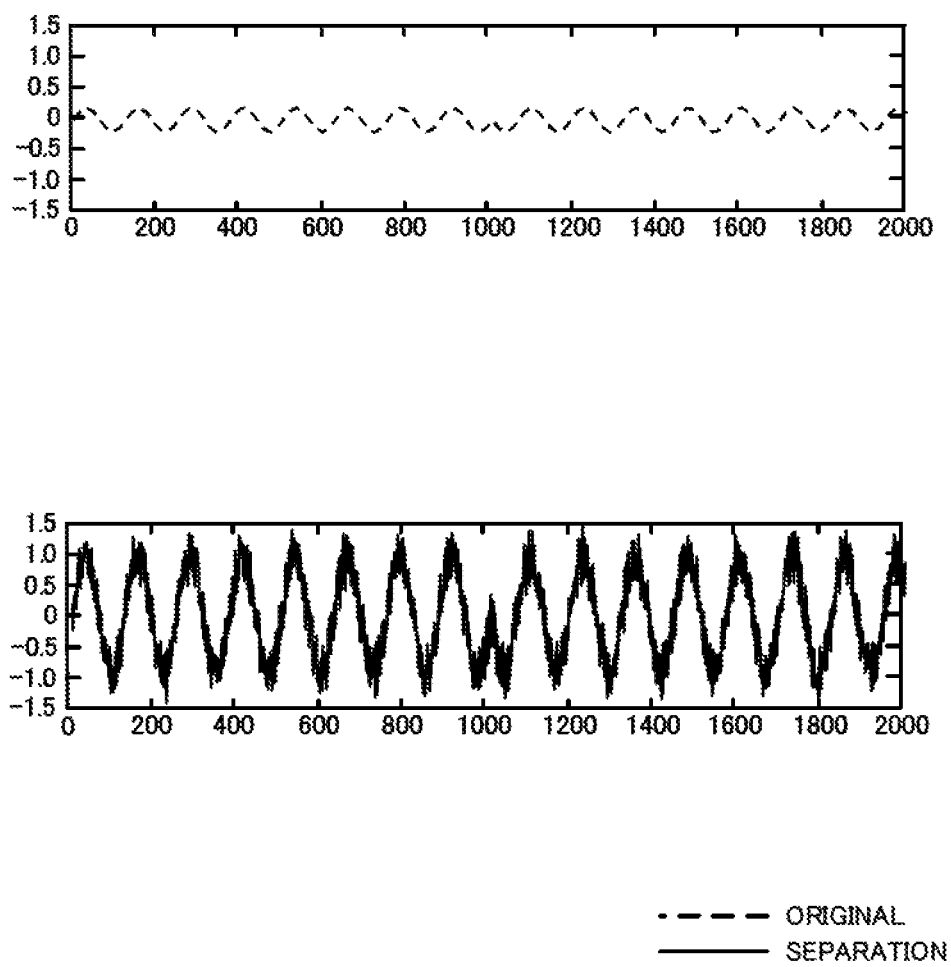
FIG. 10 is a diagram showing the second evaluation result.

Hereinafter, the second evaluation result is explained. FIGS. 9 and 10 show the second evaluation result. Here, evaluated is a case that the two backscatter signals are separated from the mixed signal including the two backscatter signals respectively transmitted from the two tag devices 10, according to the method explained in the embodiment described above.

In FIGS. 9 and 10, the upper section indicates a waveform (original) of the backscatter signal transmitted from the tag device 10, and the lower section indicates a waveform (a separation result) of the backscatter signal separated by the radio communication apparatus 20. Note that the separation result is normalized (five times) in FIG. 10. FIG. 9 shows the evaluation result of the first backscatter signal, and FIG. 10 shows the evaluation result of the second backscatter signal.

As shown in FIGS. 9 and 10, it is confirmed that both of two backscatter signals are separated appropriately according to the method explained in the embodiment described above.

OTHER EMBODIMENTS

The present invention has been described in terms of the embodiment set forth above. However, the invention should not be understood to be limited by the statements and the drawings constituting a part of this disclosure. From this disclosure, various alternative embodiments, examples, and operational technologies will become apparent to those skilled in the art.

Although not particularly mentioned in the embodiments, the phase of the two or more backscatter signals respectively transmitted from the two tag devices are different because of the difference in installed locations or crocks of respective two tag devices, a distance toward respective two tag devices, or the like. In other word, the two or more backscatter signals respectively transmitted from the two tag devices are signals having different phases or amplitudes.

In the first modification, exemplified is a case that the three backscatter signals are respectively transmitted from the three tag devices. However, the first modification is not limited to this. The first modification can be applied for a case that receiving four or more backscatter signals are respectively transmitted from four or more tag devices. A condition required for such a case is a condition that the reception antennas is equal to or more than ½ of the number of separation target backscatter signals (the number of the tag devices). Further, the number of the reception antennas is preferably less than the number of the tag devices.

In the first modification, exemplified is a case that the two reception antennas are provided for three tag devices 10 as a case enables the improvement of S/N ratio. However, the first modification is not limited to this. To improve the SN ratio, it is enough that the radio communication apparatus includes the two or more reception antennas, and the number of the tag devices is nothing to do with the improvement. Accordingly, the number of the tag devices which assigned with two or more antennas may be one or two. Further, if the backscatter signals can be separated, the number of the tag devices which assigned with two or more antennas may be four or more.

Although not particularly mentioned in the embodiments, the modulation method of the backscatter signal is not limited if the backscatter signal is a signal adjustable to the zero-crossing signal on the IQ plane. That is, the modulation method of the backscatter signal may be a binary modulation or a multi-level modulation. In such a case, the variance of the samples may preferably converge to the predetermined value for the IQ frame including enough samples.

Although not particularly mentioned in the embodiments, the radio communication apparatus 20 knows it in advance that the backscatter signal transmitted from the tag device is the zero-crossing signal and the variance of amplitude converges to the predetermined value.

Although not particularly mentioned in the embodiments, a program may be provided for causing a computer to execute each process performed by the radio communication apparatus 20. Further, the program may be recorded on a computer-readable medium. If the computer-readable medium is used, it is possible to install the program on a computer. Here, the computer-readable medium recording therein the program may be a non-transitory recording medium. The non-transitory recording medium may include, but not be limited to, a CD-ROM and a DVD-ROM, for example.

Alternatively, a chip may be provided, which includes a memory for storing the program for performing each process executed by the radio communication apparatus 20, and a processor for executing the program stored in the memory.

What is claimed is:

1. A radio communication apparatus comprising:
   one or more reception antennas that receive a mixed signal including two or more backscatter signals respectively transmitted from two or more tag devices,
   a converter that converts the mixed signal into complex data on a complex plane,
   a calculator that calculates at least phase angles of carrier waves of the two or more backscatter signals in order to approximate the phase angles to a complex data sequence of a predetermined length, the complex data sequence formed of the complex data, wherein the calculator generates a projector matrix formed of a combination of the phase angles of carrier waves of the two or more backscatter signals, and
   a separator that separates the two or more backscatter signals from the mixed signal based on an inverse matrix of the projector matrix and the complex data sequence
   wherein a number of reception antennas, out of the one or more reception antennas, used in calculating the phase angles of the carrier waves of the two or more backscatter signals, is less than a number of the two or more tag devices.

2. The radio communication apparatus according to claim 1, comprising:
   a transmission antenna that transmits a carrier signal used for transmitting the two or more backscatter signals from two or more tag devices respectively.

3. The radio communication apparatus according to claim 1, wherein
   a number of the one or more reception antennas is less than the number of the two or more tag devices.

4. The radio communication apparatus according to claim 1, wherein
   a number of the one or more reception antennas is an integer equal to or more than ½ of the number of the two or more tag devices.

5. The radio communication apparatus according to claim 4, wherein
   two or more reception antennas are assigned to a predetermined tag device which is one of the two or more tag devices, and
   the separator separates two or more predetermined backscatter signals respectively from two or more mixed signal received by the two or more reception antennas, and acquires the backscatter signal for the predetermined tag device by combining the two or more predetermined backscatter signals.

6. The radio communication apparatus according to claim 1, wherein
   the two or more backscatter signals are adjusted to cross an origin on the complex plane.

7. A radio communication system comprising a radio communication apparatus and two or more tag devices, wherein:
   the two or more tag devices each comprise:
      a transmitter that transmits a backscatter signal, and
   the radio communication apparatus comprises:
      one or more reception antennas that receive a mixed signal including two or more backscatter signals respectively transmitted from the two or more tag devices,
      a converter that converts the mixed signal into complex data on a complex plane,
      a calculator that calculates at least phase angles of carrier waves of the two or more backscatter signals in order to approximate the phase angles to a complex data sequence of a predetermined length, the complex data sequence formed of the complex data, wherein the calculator generates a projector matrix formed of a combination of the phase angles of carrier waves of the two or more backscatter signals, and
      a separator that separates the two or more backscatter signals from the mixed signal based on an inverse matrix of the projector matrix and the complex data sequence,
   wherein a number of reception antennas, out of the one or more reception antennas, used in calculating the phase angles of the carrier waves of the two or more backscatter signals, is less than a number of the two or more tag devices.

8. A radio communication method comprising steps of:
   receiving a mixed signal including two or more backscatter signals respectively transmitted from two or more tag devices by one or more reception antennas,
   converting the mixed signal into complex data on a complex plane,
   calculating at least phase angles of carrier waves of the two or more backscatter signals in order to approximate the phase angles to a complex data sequence of a predetermined length, the complex data sequence formed of the complex data, and generating a projector matrix formed of a combination of the phase angles of carrier waves of the two or more backscatter signals, and separating the two or more backscatter signals from the mixed signal based on an inverse matrix of the projector matrix and the complex data sequence, wherein a number of reception antennas, out of the one or more reception antennas, used in calculating the phase angles of the carrier waves of the two or more backscatter signals, is less than a number of the two or more tag devices.

* * * * *